United States Patent
Liu et al.

(10) Patent No.: US 8,041,619 B1
(45) Date of Patent: Oct. 18, 2011

(54) HYBRID MODEL FOR NEW ACCOUNT ACQUISITION

(75) Inventors: Xiahou Liu, Westchester, PA (US); Richard W. Cole, Westchester, PA (US); Shaohui Jia, Wilmington, DE (US)

(73) Assignee: Bank of America Corporation, Charlotte, NC (US)

( * ) Notice: Subject to any disclaimer, the term of this patent is extended or adjusted under 35 U.S.C. 154(b) by 559 days.

(21) Appl. No.: 12/257,693

(22) Filed: Oct. 24, 2008

(51) Int. Cl.
*G06Q 40/00* (2006.01)
*G06F 17/30* (2006.01)

(52) U.S. Cl. .......................................... 705/35; 707/776

(58) Field of Classification Search ................... 707/776
See application file for complete search history.

(56) References Cited

U.S. PATENT DOCUMENTS

| | | | | |
|---|---|---|---|---|
| 7,707,059 | B2 * | 4/2010 | Reed et al. | 705/7.31 |
| 7,925,578 | B1 * | 4/2011 | Hong et al. | 705/38 |
| 2005/0234753 | A1 * | 10/2005 | Pinto et al. | 705/7 |
| 2007/0016542 | A1 * | 1/2007 | Rosauer et al. | 706/21 |
| 2008/0279434 | A1 * | 11/2008 | Cassill | 382/131 |

FOREIGN PATENT DOCUMENTS

WO WO 0034910 A2 * 6/2000

OTHER PUBLICATIONS

Predictable Response.(ways to boost response to direct marketing campaigns)(Statistical Data Included) Collins, Steve Bank Marketing, v 33, n 6, p. 25 Jul. 2001.*

Simulation and optimisation in direct marketing. Part 1: Using simulation models to develop forecasts McDoniel, P Bruce; Monteleone, J Patrick Journal of Database Marketing v9n1 pp. 35-44 Sep. 2001.*

Defection Detection: Measuring and Understanding the Predictive Accuracy of Customer Churn Models Scott A. Neslin, Sunil Gupta, Wagner Kamakura, Junxiang Lu, and Charlotte H. Mason © 2006, American Marketing Association.*

Implementing neural networks for decision support in direct marketing. Cui, Geng; Wong, Man Leung International Journal of Market Research, 46, 2, 235(21) Summer, 2004.*

Diagnosing and Predicting Individual Customer Defection in a Contractual Setting Andr'e Bonfrer George Knox Jehoshua Eliashberg Jeongwen Chiang Mar. 2007.*

* cited by examiner

*Primary Examiner* — William Rankins (74) *Attorney, Agent, or Firm* — Michael A. Springs; Moore & Van Allen PLLC; Andrew L. Haynes (57) ABSTRACT

A hybrid model for new account acquisition is disclosed. A software tool can be provided to implement a statistical model that produces a hybrid score and corresponding decile segregation. The statistical model is a hybrid of a net conversion rate (NCR) model and an approval model, and may thus be referred to herein as a hybrid model. In example embodiments, a set of hybrid scores is calculated for each of a plurality of values of alpha to produce a decile level lift table for each set of hybrid scores. Potential values for alpha tend to lower the hybrid scores for declined prospects. The decile level lift tables can be used to facilitate selection of a value for alpha to optimize a performance metric associated with the new account acquisition. In some embodiments, a cost-benefit curve can be created from the lift tables.

21 Claims, 7 Drawing Sheets

| DECILE | NUMBER OF PROSPECTS | RESPONSE RATE | APPROVAL RATE | NCR RATE | CUMULATIVE NUMBER OF PROSPECTS | CUMULATIVE RESPONSE RATE | CUMULATIVE NCR RATE | CUMULATIVE NUMBER OF ACQUIRES | CUMULATIVE ACQUISITION COST | CUMULATIVE COST PER ACQUIRE |
|---|---|---|---|---|---|---|---|---|---|---|
| 1 | 264,894 | 0.826% | 23.17% | 0.191% | 264,894 | 0.826% | 0.191% | 507 | $136,485 | $269 |
| 2 | 264,894 | 0.747% | 18.46% | 0.138% | 529,788 | 0.787% | 0.165% | 872 | $268,771 | $308 |
| 3 | 264,894 | 0.658% | 18.45% | 0.121% | 794,682 | 0.744% | 0.150% | 1,194 | $396,348 | $332 |
| 4 | 264,895 | 0.562% | 18.68% | 0.105% | 1,059,577 | 0.698% | 0.139% | 1,472 | $518,822 | $352 |
| 5 | 264,894 | 0.507% | 20.29% | 0.103% | 1,324,471 | 0.660% | 0.132% | 1,744 | $638,403 | $366 |
| 6 | 264,894 | 0.459% | 20.61% | 0.095% | 1,589,365 | 0.627% | 0.126% | 1,995 | $755,447 | $379 |
| 7 | 264,895 | 0.383% | 19.61% | 0.075% | 1,854,260 | 0.592% | 0.118% | 2,194 | $868,454 | $396 |
| 8 | 264,894 | 0.349% | 22.09% | 0.077% | 2,119,154 | 0.561% | 0.113% | 2,399 | $979,672 | $408 |
| 9 | 264,894 | 0.322% | 20.77% | 0.067% | 2,384,048 | 0.535% | 0.108% | 2,576 | $1,089,448 | $423 |
| 10 | 264,895 | 0.250% | 22.64% | 0.057% | 2,648,943 | 0.506% | 0.103% | 2,726 | $1,195,401 | $439 |

FIG. 3

| DECILE | NUMBER OF PROSPECTS | RESPONSE RATE | APPROVAL RATE | NCR RATE | CUMULATIVE NUMBER OF PROSPECTS | CUMULATIVE RESPONSE RATE | CUMULATIVE NCR RATE | CUMULATIVE NUMBER OF ACQUIRES | CUMULATIVE ACQUISITION COST | CUMULATIVE COST PER ACQUIRE |
|---|---|---|---|---|---|---|---|---|---|---|
| 1 | 264,894 | 0.126% | 61.78% | 0.078% | 264,894 | 0.126% | 0.078% | 206 | $99,384 | $482 |
| 2 | 264,894 | 0.156% | 60.67% | 0.095% | 529,788 | 0.141% | 0.086% | 457 | $200,363 | $439 |
| 3 | 264,894 | 0.169% | 57.37% | 0.097% | 794,682 | 0.150% | 0.090% | 714 | $302,037 | $423 |
| 4 | 264,895 | 0.211% | 49.55% | 0.105% | 1,059,577 | 0.166% | 0.094% | 991 | $405,939 | $410 |
| 5 | 264,894 | 0.267% | 42.35% | 0.113% | 1,324,471 | 0.186% | 0.097% | 1,291 | $512,800 | $397 |
| 6 | 264,894 | 0.348% | 36.01% | 0.125% | 1,589,365 | 0.213% | 0.102% | 1,622 | $623,936 | $385 |
| 7 | 264,895 | 0.420% | 24.98% | 0.105% | 1,854,260 | 0.242% | 0.102% | 1,900 | $738,913 | $389 |
| 8 | 264,894 | 0.588% | 19.38% | 0.114% | 2,119,154 | 0.286% | 0.104% | 2,202 | $862,800 | $392 |
| 9 | 264,894 | 0.889% | 11.69% | 0.104% | 2,384,048 | 0.353% | 0.104% | 2,478 | $1,002,595 | $405 |
| 10 | 264,895 | 1.889% | 4.96% | 0.094% | 2,648,943 | 0.506% | 0.103% | 2,726 | $1,195,401 | $439 |

FIG. 4

| DECILE | NUMBER OF PROSPECTS | RESPONSE RATE | APPROVAL RATE | NCR RATE | CUMULATIVE NUMBER OF PROSPECTS | CUMULATIVE RESPONSE RATE | CUMULATIVE NCR RATE | CUMULATIVE NUMBER OF ACQUIRES | CUMULATIVE ACQUISITION COST | CUMULATIVE COST PER ACQUIRE |
|---|---|---|---|---|---|---|---|---|---|---|
| 1 | 264,894 | 0.446% | 41.05% | 0.183% | 264,894 | 0.446% | 0.183% | 485 | $116,353 | $240 |
| 2 | 264,894 | 0.396% | 33.27% | 0.132% | 529,788 | 0.421% | 0.157% | 834 | $230,040 | $276 |
| 3 | 264,894 | 0.394% | 29.75% | 0.117% | 794,682 | 0.412% | 0.144% | 1,145 | $343,647 | $300 |
| 4 | 264,895 | 0.384% | 28.95% | 0.111% | 1,059,577 | 0.405% | 0.136% | 1,439 | $456,698 | $317 |
| 5 | 264,894 | 0.342% | 27.70% | 0.095% | 1,324,471 | 0.392% | 0.128% | 1,690 | $567,520 | $336 |
| 6 | 264,894 | 0.316% | 26.66% | 0.084% | 1,589,365 | 0.380% | 0.120% | 1,913 | $676,999 | $354 |
| 7 | 264,895 | 0.327% | 23.60% | 0.077% | 1,854,260 | 0.372% | 0.114% | 2,118 | $787,035 | $372 |
| 8 | 264,894 | 0.356% | 20.54% | 0.073% | 2,119,154 | 0.370% | 0.109% | 2,311 | $898,596 | $389 |
| 9 | 264,894 | 0.432% | 16.69% | 0.072% | 2,384,048 | 0.377% | 0.105% | 2,502 | $1,014,178 | $405 |
| 10 | 264,895 | 1.671% | 5.05% | 0.084% | 2,648,943 | 0.506% | 0.103% | 2,726 | $1,195,401 | $439 |

| DECILE | NUMBER OF PROSPECTS | RESPONSE RATE | APPROVAL RATE | NCR RATE | CUMULATIVE NUMBER OF PROSPECTS | CUMULATIVE RESPONSE RATE | CUMULATIVE NCR RATE | CUMULATIVE NUMBER OF ACQUIRES | CUMULATIVE ACQUISITION COST | CUMULATIVE COST PER ACQUIRE |
|---|---|---|---|---|---|---|---|---|---|---|
| 1 | 264,894 | 0.317% | 51.21% | 0.163% | 264,894 | 0.317% | 0.163% | 431 | $109,533 | $254 |
| 2 | 264,894 | 0.240% | 48.85% | 0.117% | 529,788 | 0.279% | 0.140% | 741 | $214,968 | $290 |
| 3 | 264,894 | 0.221% | 48.04% | 0.106% | 794,682 | 0.259% | 0.129% | 1,022 | $319,369 | $312 |
| 4 | 264,895 | 0.217% | 42.14% | 0.092% | 1,059,577 | 0.249% | 0.119% | 1,265 | $423,597 | $335 |
| 5 | 264,894 | 0.215% | 38.80% | 0.083% | 1,324,471 | 0.242% | 0.112% | 1,486 | $527,691 | $355 |
| 6 | 264,894 | 0.226% | 35.99% | 0.081% | 1,589,365 | 0.239% | 0.107% | 1,701 | $632,369 | $372 |
| 7 | 264,895 | 0.276% | 28.32% | 0.078% | 1,854,260 | 0.245% | 0.103% | 1,908 | $739,710 | $388 |
| 8 | 264,894 | 0.510% | 19.04% | 0.097% | 2,119,154 | 0.278% | 0.102% | 2,165 | $859,446 | $397 |
| 9 | 264,894 | 0.872% | 12.25% | 0.107% | 2,384,048 | 0.344% | 0.103% | 2,448 | $998,336 | $408 |
| 10 | 264,895 | 1.970% | 5.32% | 0.105% | 2,648,943 | 0.506% | 0.103% | 2,726 | $1,195,401 | $439 |

HYBRID MODEL FOR NEW ACCOUNT ACQUISITION

BACKGROUND

Understanding how to execute a business process within a company or enterprise in order to maximize revenue, profit, or other metrics, is of enormous importance and has a significant impact on the company's success in the marketplace. Ideally therefore, business processes should be objectively evaluated and adjusted in much the same way as scientific or manufacturing processes. In particular, it is important to know how to optimize various business metrics.

In financial services, for example, it is important to optimize metrics with respect to new credit account acquisition resulting from direct mailings or other marketing efforts. Potential customers targeted by such efforts are sometimes referred to as "prospects." Statistical models can be used to study and evaluate responses from prospects for new account acquisition; just as such models can be used to model customer behavior in many other areas of business.

SUMMARY

Embodiments of the invention provide a statistical model that produces a hybrid score and corresponding decile segregation. The statistical model is a hybrid of a net conversion rate (NCR) model and an approval model, and may thus be referred to herein as a hybrid model.

In example embodiments, a method of rank ordering prospects for new account acquisition includes building a net conversion rate model using prospects data to predict the likelihood for a prospect to respond and to be approved, and building an approval model using responders data to predict the likelihood for a responder to be approved. A set of hybrid scores is calculated for each of a plurality of values of alpha using net conversion rate model scores and approval model scores to produce a decile level lift table for each set of hybrid scores. Potential values for alpha tend to lower the hybrid scores for declined prospects. The decile level lift tables for at least two sets of hybrid scores are stored and can be used to facilitate selection of a specific value for alpha to optimize a performance metric associated with the new account acquisition.

In some embodiments, the decile level lift tables can be displayed to facilitate user-selection of the appropriate alpha. Alternatively, in some embodiments, the value of alpha can be programmatically selected to optimize the performance metric. Performance metrics to be optimized can include, but are not limited to, cumulative cost per acquire, outstanding balance of booked accounts and net profit on booked accounts in a specified time period. In some embodiments, a cost-benefit curve can be displayed by determining cumulative acquisition cost and cumulative number of acquires from the lift table.

In some embodiments, a system implementing the invention includes an instruction execution platform to build a net conversion rate model using prospects data and an approval model using responders data, calculate hybrid scores for each of a plurality of values of alpha using net conversion rate model scores and approval model scores, and to store decile level lift tables. Data set storage can be functionally connected to the instruction execution platform to provide the prospects data and responders data. The instruction execution platform and the data set storage can be connected by a network. Computer program code instructions in combination with the hardware of the instruction execution platform can form the means to carry out the features and functions of embodiments of the invention.

BRIEF DESCRIPTION OF THE DRAWINGS

FIG. 3 is a lift table corresponding to an NCR model.

FIG. 4 is a lift table corresponding to an approval model.

FIG. 5 is a lift table corresponding to a hybrid model for an alpha of 0.15 relative to a specific example according to example embodiments of the invention.

FIG. 6 is a lift table corresponding to a hybrid model for an alpha of 0.3 relative to a specific example according to example embodiments of the invention.

DETAILED DESCRIPTION OF THE INVENTION

The following detailed description of embodiments refers to the accompanying drawings, which illustrate specific embodiments of the invention. Other embodiments having different structures and operation do not depart from the scope of the present invention.

The detailed example embodiments presented herein provide way to rank order potential new account prospects to facilitate an account acquisition strategy. An embodiment of the invention can be useful, for example, for a financial institution such as a bank to determine which potential customers should receive credit card solicitations in the mail.

The use of the term "bank" and any similar terms herein, such as the term "financial institution" is intended in its broadest sense. Any financial institution can make use of the tool described herein. As used herein, the term "financial institution" refers to an institution that acts as an agent to provide financial services for its clients or members. Financial institutions generally, but not always, fall under financial regulation from a government authority. Financial institutions include, but are not limited to, banks, building societies, credit unions, stock brokerages, asset management firms, savings and loans, money lending companies, insurance brokerages, insurance underwriters, dealers in securities, and similar businesses. Additionally, however, embodiments of the present invention can be used by any business, nonprofit organization, or even government entities that need to determine a strategy or evaluate a metric in connection with customer acquisition.

The hybrid model according to example embodiments of the present invention combines an NCR model with an approval model to obtain an improved score, referred to herein as a hybrid score. The hybrid score, if carefully selected, can rank order both the NCR rate and the approval rate fairly well for a given set of prospects in new account acquisition. A new account acquisition campaign based on the hybrid score can book more high-quality accounts with less acquisition cost. Acquisition cost includes mailing cost and decisioning cost.

Either the NCR model (including both a 1-step and 2-step) approach or the approval model approach can be used alone in acquisition modeling. However, the NCR model can not rank order the approval rate well. The selected prospects using an NCR model tend to have high response rate, but are not necessarily of low risk. The approval model can not rank NCR rate well. The selected prospects using the approval model tend to have a low response rate.

In the hybrid approach according to example embodiments of the invention, a parameter called alpha is introduced to statistically punish the declined prospects, so that the hybrid score tends to force these worst prospects into bottom deciles when segmenting, while not significantly sacrificing the new accounts booked rate. By carefully selecting the parameter alpha, one can create hybrid score deciles that are almost as good as an NCR model in separation of NCR rate, but are much better in separation of approval rate than an NCR model. In practice, the optimal alpha can be chosen, so that the deciles created by the hybrid model are more effective than either the NCR model or the approval model in terms of booking more high-quality accounts with a given acquisition cost, including mailing cost and credit decisioning cost.

The hybrid approach according to example embodiments of the invention estimates the dependent variable Y, $$Y = \begin{cases} 1 & \text{if approved} \\ -alpha & \text{if declined} \\ 0 & \text{if no response} \end{cases}$$

where alpha>0.

With this model, alpha is introduced to force a declined prospect have a lower score. The hybrid model score is the expected value of Y, Hybrid score=(NCR model score)*{1−alpha/(approval model score)+alpha} (1)

Proof: Let P(•) be the probability of an event.
For a given individual, the event of response=the union of the event of 'approval' and the event of 'decline'.

$$NCR \text{ model score} = P(\text{response, approval}) \quad (2)$$
$$= P(\text{response}) * P(\text{approval} | \text{response})$$
$$= P(\text{response}) * (\text{approval model score}).$$
$$\text{hybrid score} = P(\text{approval}) - alpha * P(\text{decline})$$
$$= P(\text{response, approval}) - alpha * P(\text{response, decline})$$
$$= P(\text{response}) * P(\text{approval} | \text{response}) - alpha * P(\text{response}) * P(\text{decline} | \text{response})$$
$$= P(\text{response, approval}) / P(\text{approval} | \text{response}) * \{P(\text{approval} | \text{response}) - alpha * (1 - P(\text{approval} | \text{response}))\}$$

End of the proof.

Based on equation (1), when alpha=0, the hybrid score becomes the NCR model score. Based on equation (2), when alpha goes to infinity, the NCR model score approaches to the negative probability of decline. In practice, using an embodiment of the invention, a small alpha can be selected so that the hybrid score rank orders both the NCR rate and the approval rate well. However, even when alpha is relatively large, the hybrid score rank orders the approval rate, if not the NCR rate, relatively well. Using equation (1), with a given alpha, the existing NCR model score, and the approval model score, the hybrid score can be calculated immediately at the prospect level.

Figure 1:
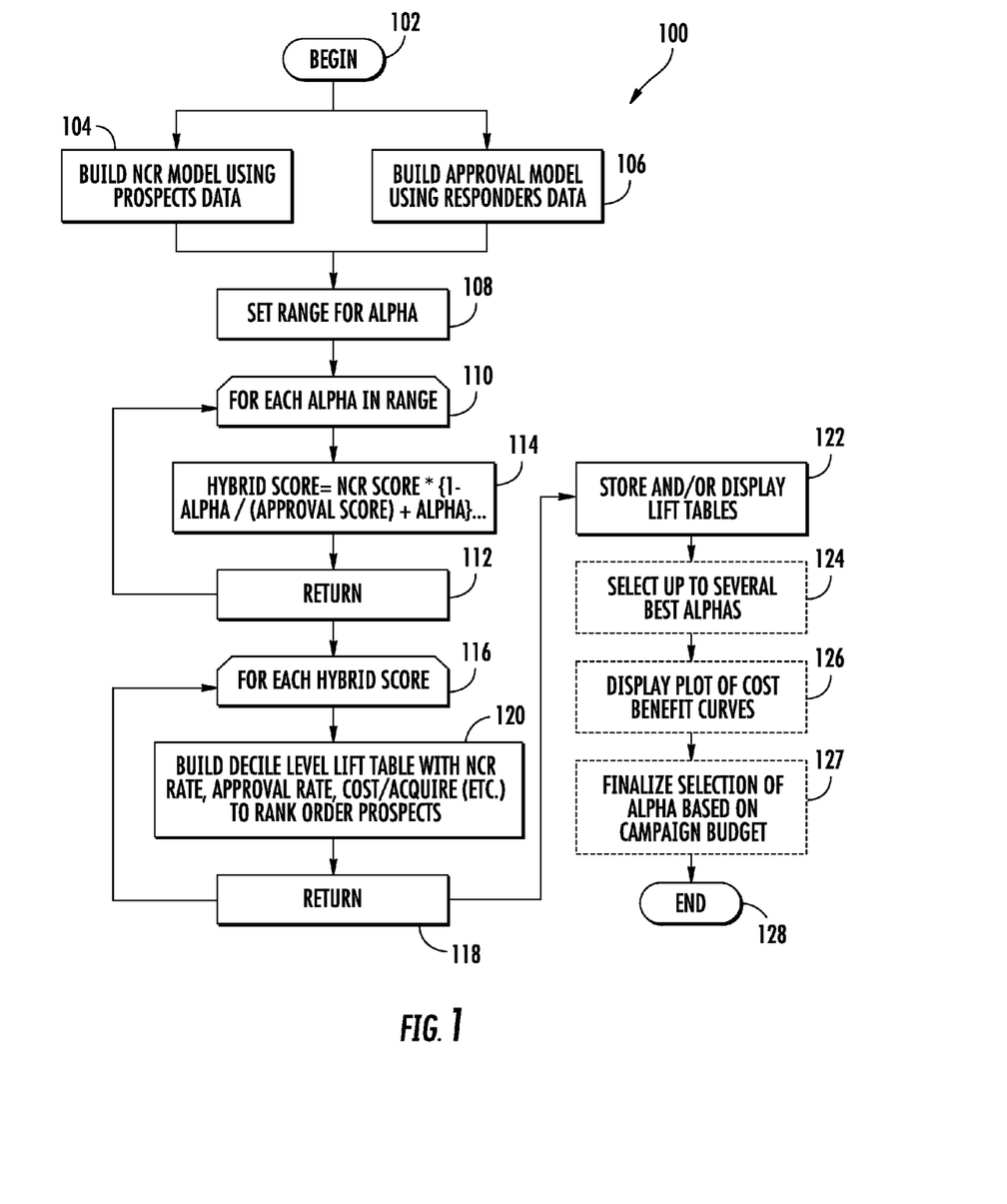
FIG. 1 is a flowchart illustrating a method according to example embodiments of the present invention.

FIG. 1 is a flowchart illustrating process 100 according to example embodiments of the present invention. Like most flowcharts, FIG. 1 presents process 100 as a series of process and/or sub-process blocks. Process 100 begins at block 102. At block 104, an NCR model is built using prospects data. At block 106, an approval model is built using responders data. Note that although these two sub-processes can take place simultaneously as shown, they may also take place in any order. Prospects and responders data can come from various sources. As an example, data from a historical marketing campaign can be used. Alternatively, a small-scale pilot test can be conducted to gather data. At block 108 in FIG. 1, a range of alpha values for which to calculate scores is selected at the prospect level. In practice, as an example, the range of alpha can be chosen as alpha=0.01*k where k=1, 2, . . . , 100.

Still referring to FIG. 1, loop limit block 110 and return block 112 form a loop in which hybrid scores for each alpha value are calculated until the process steps through all alpha values. Equation (1) is used as shown at block 114. Similarly, loop limit block 116 and return block 118 form a loop in which a decile level lift table is built for each hybrid score. The decile level lift table, with NCR rate, approval rate cost to acquire, and other parameters as needed, is built at block 120. At block 122, the decile level lift tables are stored in a memory, and/or optionally displayed so that a user can select an appropriate alpha value for use in account acquisition. In some embodiments, process 100 then ends. In other embodiments, the best values for alpha can optionally be selected programmatically at block 124, and in some embodiments, cost-benefit curve(s) can be plotted and displayed for a user at block 126. Also optionally, the best alpha can be selected programmatically from the cost benefit curves as shown at block 127. Process 100 ends at block 128.

Figure 2:
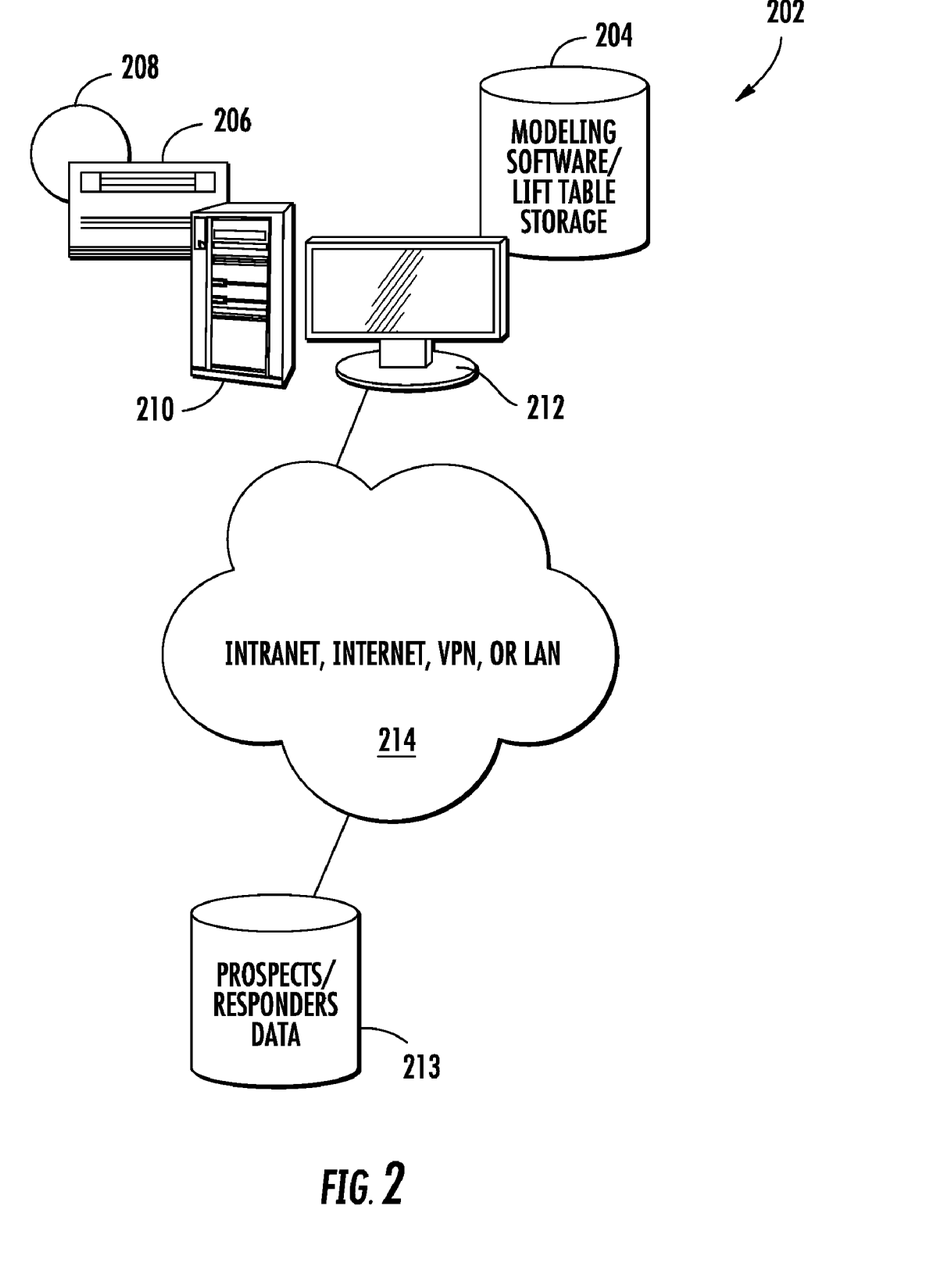
FIG. 2 is a system block diagram illustrating an operating environment and apparatus used with example embodiments of the invention.

FIG. 2 illustrates a typical operating environment for embodiments of the present invention. FIG. 2 actually illustrates two alternate embodiments of a system implementing the invention. Computer system 202 can be a workstation or personal computer. System 202 can be operated in a "stand-alone" mode, in which a user enters all data and/or the data is stored only locally. The system includes a fixed storage medium, illustrated graphically at 204, for storing modeling software or other programs, which enable the use of an embodiment of the invention. In a stand-alone embodiment, fixed storage medium 204 can also include prospect and responder data for use in running the model and creating decile level lift tables. In some embodiments lift tables and graphical plots might also be stored on fixed storage medium 204. In this particular example, an optical drive, 206, is connected to the computing platform for loading the appropriate computer program product into system 202 from an optical disk, 208. The computer program product includes a computer program code with instructions for carrying out the methods of the invention.

Instruction execution platform 210, which includes a microprocessor and supporting memory and other hardware, can execute the appropriate instructions and display appropriate screens on display device 212. These screens can include lift tables a user can view to aid in selection of an alpha value, as well as cost-benefit plots. FIG. 2 also illustrates another embodiment of the invention in which case the system includes a connection to data set storage 213. Data sets can include prospect and responder data, as well as previously generated lift tables and/or cost-benefit curves. The connection to the data set storage or appropriate databases can be formed in part by network 214, which can be an intranet, virtual private network (VPN) connection, local area network (LAN) connection, or any other type of network resources, including the Internet.

It should be appreciated that if the data sets being used contain very large numbers of prospect and responder data, it may be appropriate to use significant computing resources to perform the calculations necessary to carry out an embodiment of the invention. For example, if a workstation is used, a multi-core or multi-processor based instruction execution platform using a highly efficient operating system such as a version of UNIX or LINUX may be appropriate. An embodiment of the invention could also be implemented on a mid-range or large multiuser computing platform such as a mainframe.

In order to allow the reader to more fully appreciate a practical embodiment of the invention, a specific example of a hybrid model created to allow a value of alpha to be selected to minimize cost per acquisition will now be presented. Generally, an alpha value that provides a good NCR rate separation and a fairly good approval rate separation works well. It is important to keep in mind though, that the free parameter alpha can be selected to optimize any specific performance metric.

Figure 3:
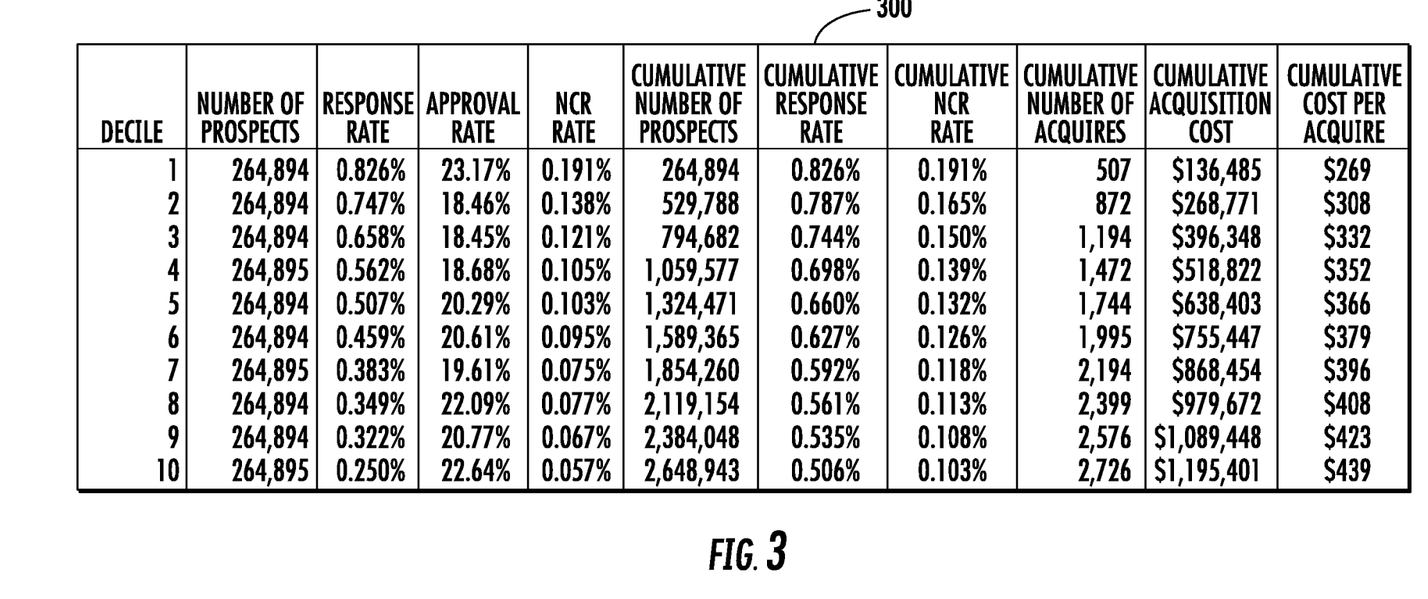
FIG. 3 is a lift table that might be stored and/or displayed with example embodiments of the invention. More specifically.

In this example it can be assumed that the mailing cost per mail piece is $0.35 U.S., and the cost of making a credit decision per piece is $20.00 U.S. An NCR model can be built on prospect data using this information. Calculating performance metrics at the decile level results in lift table 300 shown in FIG. 3. The cumulative acquisition cost (column 10) is equal to the cumulative number of prospects (column 6) multiplied by $0.35 plus the cumulative number of prospects (column 6) multiplied by the cumulative response rate (column 7) multiplied by $20.00. The cumulative cost per acquire (column 11) is equal to the cumulative acquisition cost (column 10) divided by the cumulative number of acquires (column 9). As can be seen in FIG. 3, the NCR model does well in rank ordering the NCR rate, but it does not rank order the approval rate well.

Figure 4:
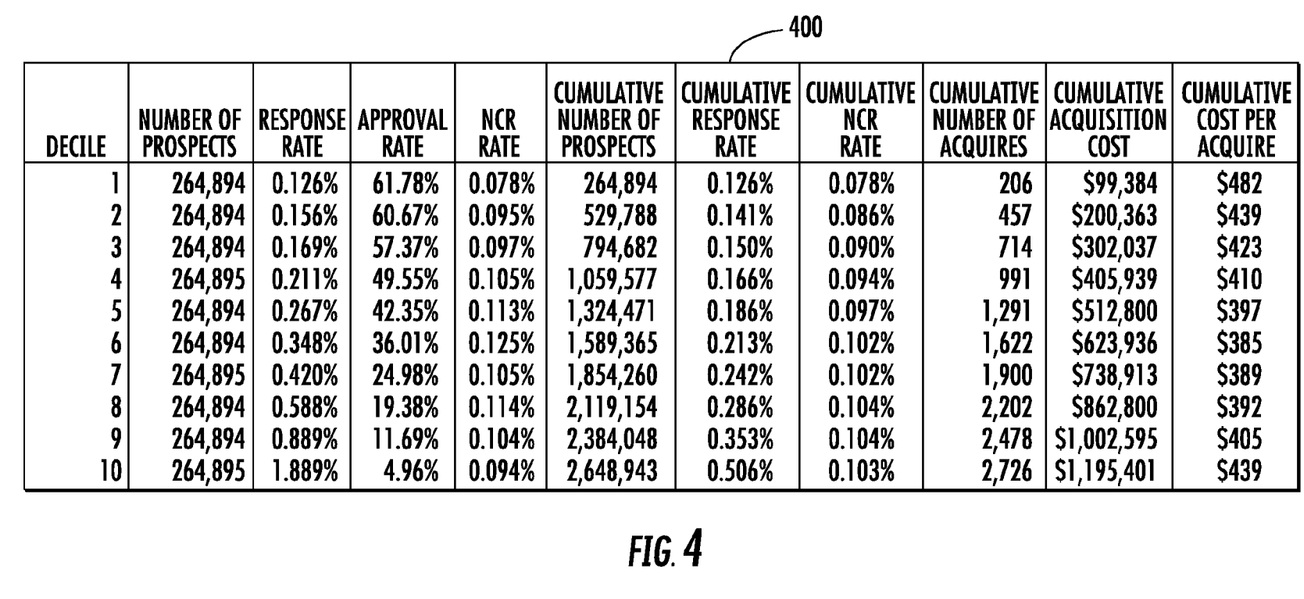
FIG. 4 is another lift table that might be stored and/or displayed with example embodiments of the invention. More specifically.

For the present example, an approval model is then built based on data for the population of responders. This approval model is then used to score all prospects, creating prospect level lift table 400 shown in FIG. 4. Note that the approval model does better in rank ordering the approval rate, but it does not rank order the NCR rate very well.

Figure 5:
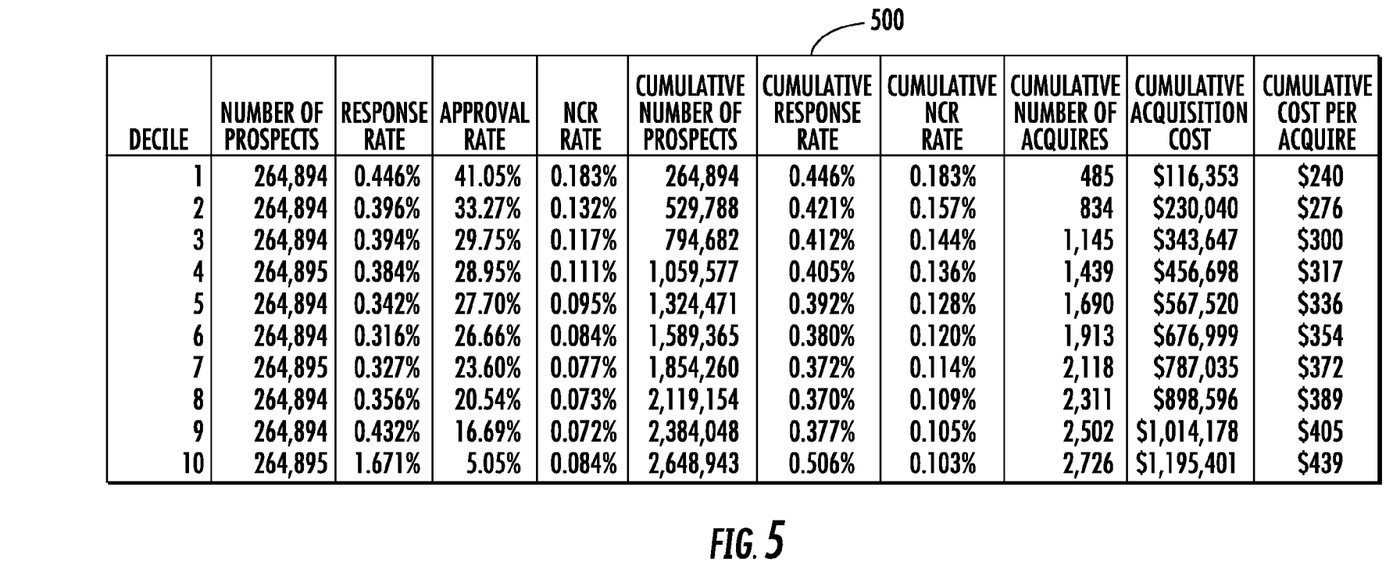
FIG. 5 is another lift table that might be stored and/or displayed with example embodiments of the invention. More specifically.
Figure 6:
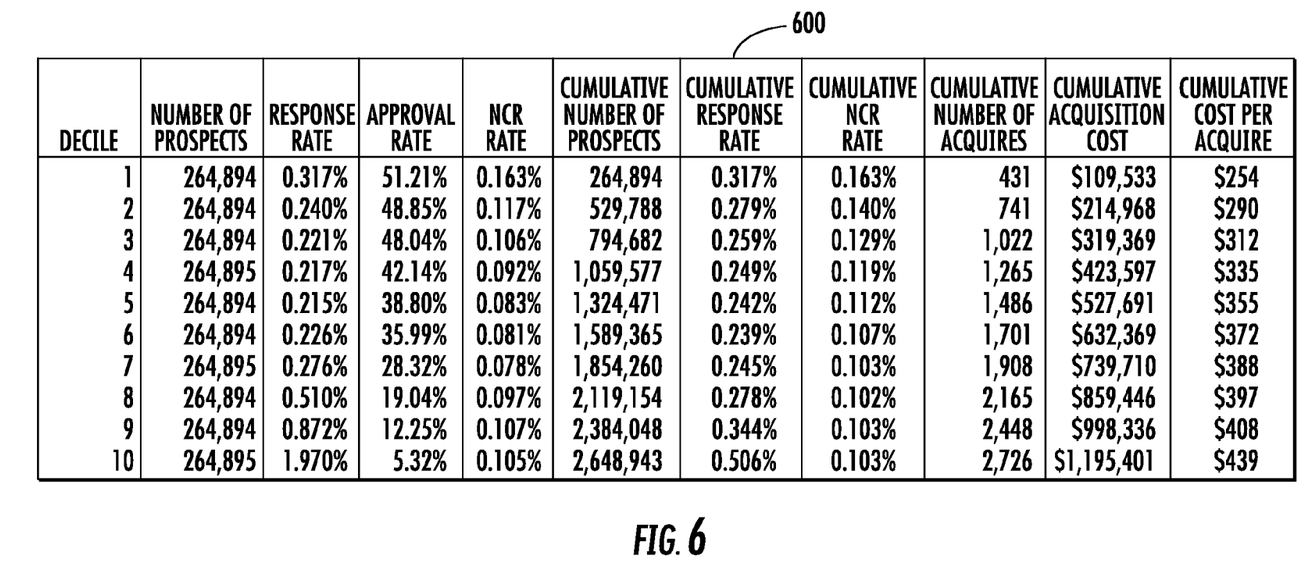
FIG. 6 is another lift table that might be stored and/or displayed with example embodiments of the invention. More specifically.

Next in this example, for a set of alpha values, 0.01, 0.02, 0.03 . . . , 1, equation (1) is used to calculate a set of hybrid scores for each value of alpha. For purposes of brevity of illustration, only two lift tables are actually reproduced here. FIG. 5 shows lift table 500, which has hybrid scores for an alpha equal to 0.15. FIG. 6 shows lift table 600, which has hybrid scores for an alpha equal to 0.30. The next task is to select the best score.

In terms of rank ordering, the hybrid score with alpha=0.15 is a very good score. It rank orders the NCR rate fairly well, with the exception of decile 10. In addition, this score rank orders the approval rate much better than the NCR model does. If in a campaign, we want to consider mailing 50% of the prospects, then we would want to look at the top five deciles' cumulative NCR rate, which is 0.128%, very close to the NCR model's 0.132%.

The hybrid score with alpha=0.30 does a better job in rank ordering the approval rate than the hybrid score with alpha=0.15. But this score can not rank order the NCR rate well because the value of alpha is too large. This score has a cumulative NCR rate of 0.112% for the top five deciles, significantly lower than the hybrid score with alpha=0.15. Thus, if we want to choose a score that rank orders both NCR rate and the approval rate, and without sacrificing NCR rate too much when considering mailing 50% of the prospects, the hybrid score for alpha=0.15 is the better choice.

Notice that the hybrid score with alpha=0.15 also achieves the lowest cumulative cost per acquire (column 11). For instance, when considering mailing the first five deciles, the first five deciles created by this score has a cumulative cost per acquire of $336, lower than the first five deciles created from the NCR model, the first five deciles created from the approval model, and the first five deciles created from the hybrid score with alpha=0.30. Thus, in a mailing campaign, selecting the first 5 deciles based on the hybrid score with alpha=0.15 is most cost-benefit efficient. In this example, the cost is the acquisition cost, and the benefit is the number of new accounts acquired. In other business practices, possible benefit metrics could be the outstanding balance of the booked accounts in a given month, for example, the third month since booked, or the net profit of the booked accounts during the first twelve months since booked.

When comparing different scores, a more diagrammatic way than checking the cost-benefit ratio in lift tables is to make a cost and benefit analysis plot. For each score, the cumulative acquisition cost (column 10) and the cumulative number of acquires (column 9) from each score's corresponding lift table can be plotted, resulting in a cost-benefit curve like the curves shown in FIG. 7.

Figure 7:
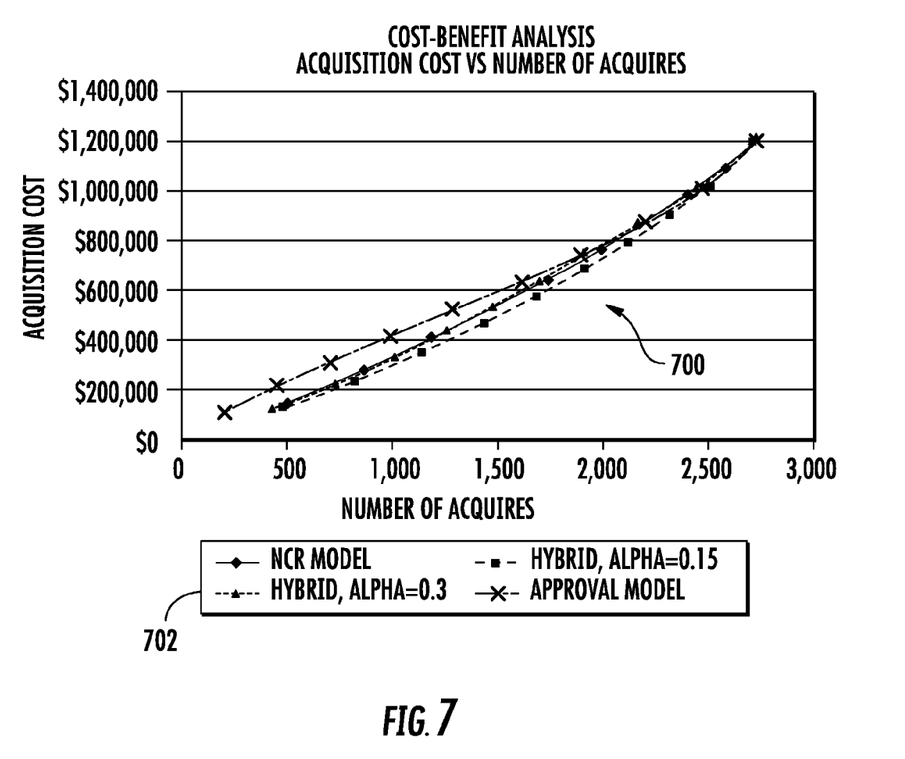
FIG. 7 is a graph illustrating a cost-benefit curve for account acquisition that can be stored and/or displayed with at least some embodiments of the invention.

FIG. 7 shows curves 700 for the four sets of example scores, the scores from the NCR model, the scores from the approval model, the scores for alpha=0.15 and the scores for alpha=0.30, as can be appreciated by reference to key 702. On this chart, the hybrid score with alpha=0.15 has a curve below the other three scores' curves. This chart indicates that if the financial institution wants to acquire a fixed number of new accounts, no matter how large that number is, using the hybrid score with alpha=0.15 for prospect selection will result in the smallest acquisition cost. Hence, based on this cost-benefit analysis, the optimal value for alpha in this example is alpha=0.15.

It should be pointed out that a different criterion may lead to a different selection for alpha. There is no universal rule for selection of alpha. One benefit of the hybrid model is that the model provides a set of scores for a user to choose. The user can choose the alpha according to business needs. In a given circumstance, there may be multiple alpha values that are potentially good choices in terms of separating the NCR rate and approval rate, and achieving a low cost-benefit ratio.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-readable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet.

In the context of this document, a computer usable or computer readable medium may be any medium that can contain, store, communicate, propagate, or transport the program for use by or in connection with the instruction execution system, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the computer executable instructions stored in the computer readable memory produce an article of manufacture including instruction means which implement the function/act specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, action, or portion of code, which comprises one or more executable instructions or actions for implementing the specified logical function(s). It should also be noted that, in some alternative implementations, the functions noted described herein may occur out of the order presented, depending upon the functionality involved. It will also be noted that each block of the block diagrams and/or flowchart illustrations, and combinations of blocks in the block diagrams and/or flowchart illustrations, can be implemented by special purpose hardware-based systems or operators which perform the specified functions or acts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Additionally, comparative, quantitative terms such as "above", "below", "less", "greater", are intended to encompass the concept of equality, thus, "less" can mean not only "less" in the strictest mathematical sense, but also, "less than or equal to."

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A computer implemented method of rank ordering prospects for new account acquisition, the method comprising:
   building a net conversion rate model using prospects data;
   building an approval model using responders data;
   calculating, using a processor, a set of hybrid scores for each of a plurality of values of alpha using net conversion rate model scores and approval model scores, wherein alpha tends to lower the hybrid scores for declined prospects;
   producing a decile level lift table for each set of hybrid scores,
   storing the decile level lift tables for at least two sets of hybrid scores; and
   facilitating selection of a specific value for alpha from the plurality of values of alpha for optimizing a performance metric associated with the new account acquisition.

2. The method of claim 1 further comprising displaying the decile level lift tables.

3. The method of claim 1 further comprising selecting the specific value of alpha to optimize the performance metric.

4. The method of claim 1 wherein the performance metric is cumulative cost per acquire.

5. The method of claim 3 wherein the performance metric is selected from a group consisting of outstanding balance of booked accounts and net profit on booked accounts in a specified time period.

6. The method of claim 1 further comprising:
   determining cumulative acquisition cost and cumulative number of acquires from the lift tables; and displaying a plurality of cost benefit curves including a cost-benefit curve for each value of alpha.

7. The method of claim 6 further comprising selecting the specific value of alpha from the cost-benefit curves.

8. A non-transitory computer-readable storage medium having computer program code for rank ordering prospects for new account acquisition, the computer program code comprising:
   instructions for building a net conversion rate model using prospects data;
   instructions for building an approval model using responders data;
   instructions for calculating hybrid scores for each of a plurality of values of alpha using net conversion rate model scores and approval model scores, wherein alpha tends to lower the hybrid scores for declined prospects;
   instructions for producing decile level lift tables;
   instructions for storing the decile level lift tables; and
   instructions for selecting a specific value for alpha from the plurality of values of alpha for optimizing a performance metric associated with the new account acquisition.

9. The computer-readable medium of claim 8 wherein the computer program code further comprises instructions for displaying the decile level lift tables.

10. The computer-readable medium of claim 8 wherein the computer program code further comprises instructions for selecting the specific value of alpha to optimize the performance metric.

11. The computer-readable medium of claim 8 wherein the computer program code further comprises:
   instructions for determining cumulative acquisition cost and cumulative number of acquires from the lift tables; and
   instructions for displaying a plurality of cost-benefit curves including a cost-benefit curve for each value of alpha.

12. The computer-readable medium of claim 8 wherein the performance metric is cumulative cost per acquire.

13. The computer-readable medium of claim 10 wherein the performance metric is selected from a group consisting of outstanding balance of booked accounts and net profit on booked accounts in a specified time period.

14. The computer-readable medium of claim 11 further wherein the computer program code further comprises instructions for selecting the specific value of alpha from the cost-benefit curves.

15. An apparatus for rank ordering prospects for new account acquisition, the apparatus comprising:
   means for building a net conversion rate model using prospects data and an approval model using responders data;
   means for calculating hybrid scores for each of a plurality of values of alpha using net conversion rate model scores and approval model scores, wherein alpha tends to lower the hybrid scores for declined prospects;
   means for producing decile level lift tables;
   means for storing the decile level lift tables;
   means for facilitating selection of a specific value for alpha from the plurality of values of alpha for optimizing a performance metric associated with the new account acquisition.

16. The apparatus of claim 15 further comprising means for displaying the decile level lift tables.

17. The apparatus of claim 15 further comprising means for selecting the specific value of alpha to optimize the performance metric.

18. The apparatus of claim 15 further comprising:
   means for determining cumulative acquisition cost and cumulative number of acquires from the lift tables; and
   means for displaying a cost-benefit curve for each value of alpha.

19. A system for rank ordering prospects for new account acquisition, the system comprising:
   an instruction execution platform configured to:
      build a net conversion rate model using prospects data and an approval model using responders data,
      calculate hybrid scores for each of a plurality of values of alpha using net conversion rate model scores and approval model scores, wherein alpha tends to lower the hybrid scores for declined prospects,
      produce decile level lift tables,
      store the decile level lift tables, and
      facilitate selection of a specific value for alpha from the plurality of values of alpha for optimizing a performance metric associated with the new account acquisition; and
   data set storage functionality connected to the instruction execution platform providing the prospects data and responders data.

20. The system of claim 19 further comprising a display connected to the instruction execution platform to display the decile level lift tables.

21. The system of claim 19 wherein the instruction execution platform is further configured to determine cumulative acquisition cost and cumulative number of acquires from the lift tables, and further comprising a display connected to the instruction execution platform and configured to display a cost-benefit curve for each value of alpha.

* * * * *

UNITED STATES PATENT AND TRADEMARK OFFICE
CERTIFICATE OF CORRECTION

| | | |
|---|---|---|
| PATENT NO. | : 8,041,619 B1 | Page 1 of 1 |
| APPLICATION NO. | : 12/257693 | |
| DATED | : October 18, 2011 | |
| INVENTOR(S) | : Liu et al. | |

It is certified that error appears in the above-identified patent and that said Letters Patent is hereby corrected as shown below:

Title page, Item (75), change the first named inventor from "Xiahou Liu, Westchester, PA (US);" to -- Xiaohu Liu, Westchester, PA (US) --

Signed and Sealed this
Third Day of January, 2012

David J. Kappos
*Director of the United States Patent and Trademark Office*